(12) United States Patent
Smith et al.

(10) Patent No.: US 9,613,150 B2
(45) Date of Patent: Apr. 4, 2017

(54) REMOTE VIEWING OF DOCUMENTS VIA THE WEB IN REAL-TIME

(75) Inventors: Jonathan R. Smith, Lexington, KY (US); Kyle M. Himmerick, Longmont, CO (US); William M. Quinn, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 1205 days.

(21) Appl. No.: 11/966,227

(22) Filed: Dec. 28, 2007

(65) Prior Publication Data

US 2009/0172072 A1   Jul. 2, 2009

(51) Int. Cl.
G06F 17/30 (2006.01)
G06Q 10/10 (2012.01)

(52) U.S. Cl.
CPC ....... *G06F 17/30873* (2013.01); *G06Q 10/10* (2013.01)

(58) Field of Classification Search
CPC .................. G06F 17/30873; G06Q 10/10
USPC ........................................ 715/700
See application file for complete search history.

(56) References Cited

U.S. PATENT DOCUMENTS

| | | |
|---|---|---|
| 5,133,024 A | 7/1992 | Froessl |
| 5,289,293 A | 2/1994 | Kato et al. |
| 5,351,137 A | 9/1994 | Kato et al. |
| 6,615,234 B1 | 9/2003 | Adamske et al. |
| 6,687,697 B2 | 2/2004 | Collins-Thompson et al. |
| 6,898,636 B1 | 5/2005 | Adams et al. |
| 7,010,752 B2 | 3/2006 | Ly |
| 7,043,489 B1 | 5/2006 | Kelley |
| 7,143,175 B2 | 11/2006 | Adams et al. |
| 7,149,347 B1 | 12/2006 | Wnek |
| 7,219,164 B2 | 5/2007 | Shelley |
| 7,225,399 B2 | 5/2007 | Watson |
| 7,424,543 B2 | 9/2008 | Rice, III |
| 7,561,734 B1 | 7/2009 | Wnek |
| 7,584,268 B2 * | 9/2009 | Kraus et al. .................. 709/218 |
| 7,587,504 B2 | 9/2009 | Adams et al. |
| 7,764,830 B1 | 7/2010 | Wnek |
| 8,145,992 B2 | 3/2012 | Jacquin et al. |
| 8,151,183 B2 | 4/2012 | Chen et al. |
| 8,218,020 B2 | 7/2012 | Tenchio et al. |
| 2001/0054106 A1 * | 12/2001 | Anderson ............... H04L 29/06 709/227 |
| 2002/0099829 A1 | 7/2002 | Richards et al. |
| 2002/0105545 A1 * | 8/2002 | Carter et al. ................. 345/752 |

(Continued)

*Primary Examiner* — Sara England
(74) *Attorney, Agent, or Firm* — Ryan Lewis; Hoffman Warnick LLC

(57) ABSTRACT

The present invention offers a component that enables the presenter to begin presenting the first pages of the document as they become available, without having to wait on the entire document to be processed. The present invention provides an approach that is used to monitor document processing as it taking place on a server. As each page is in the document is processed (e.g., converted), a monitoring component signals a controlling component to alert it of the specific progress events (e.g., a new page available). The controlling component can immediately interface with clients using a real-time communication component, for example letting users know when each single page is available for consumption. Once alerted, an informed client can signal all other clients which page to view.

16 Claims, 2 Drawing Sheets

(56) References Cited

U.S. PATENT DOCUMENTS

| | | |
|---|---|---|
| 2002/0174010 A1 | 11/2002 | Rice, III |
| 2003/0126128 A1 | 7/2003 | Watson |
| 2003/0126129 A1 | 7/2003 | Watson |
| 2003/0135649 A1* | 7/2003 | Buckley et al. ............... 709/247 |
| 2003/0187751 A1 | 10/2003 | Watson et al. |
| 2003/0206203 A1 | 11/2003 | Ly |
| 2004/0024812 A1 | 2/2004 | Park et al. |
| 2004/0103367 A1* | 5/2004 | Riss et al. ...................... 715/506 |
| 2005/0198299 A1 | 9/2005 | Beck et al. |
| 2006/0017947 A1* | 1/2006 | Wang et al. ................. 358/1.13 |
| 2006/0031412 A1 | 2/2006 | Adams et al. |
| 2007/0088846 A1 | 4/2007 | Adams et al. |
| 2007/0171482 A1* | 7/2007 | Iwasaki ......................... 358/452 |
| 2008/0235339 A1 | 9/2008 | Lurey et al. |
| 2008/0288322 A1 | 11/2008 | Kennedy et al. |
| 2008/0293032 A1 | 11/2008 | Lee |
| 2009/0080029 A1 | 3/2009 | Vendrow et al. |
| 2009/0158181 A1 | 6/2009 | Becerra et al. |
| 2009/0254572 A1 | 10/2009 | Redlich et al. |
| 2009/0276406 A1 | 11/2009 | Kelley |
| 2009/0327874 A1 | 12/2009 | Jacquin et al. |
| 2009/0328031 A1 | 12/2009 | Pouyadou et al. |
| 2010/0024022 A1 | 1/2010 | Wells et al. |
| 2010/0094676 A1 | 4/2010 | Perra et al. |
| 2010/0128131 A1 | 5/2010 | Tenchio et al. |
| 2010/0250407 A1 | 9/2010 | Silva |
| 2010/0250415 A1 | 9/2010 | Silva |
| 2010/0250426 A1 | 9/2010 | Silva |
| 2010/0250497 A1 | 9/2010 | Redlich et al. |
| 2011/0055834 A1 | 3/2011 | Meda et al. |
| 2011/0119088 A1 | 5/2011 | Gunn |
| 2011/0161348 A1 | 6/2011 | Oron |
| 2011/0264694 A1 | 10/2011 | Rensburg et al. |
| 2011/0279458 A1 | 11/2011 | Gnanasambandam et al. |
| 2011/0280640 A1 | 11/2011 | Gnanasambandam et al. |
| 2011/0302025 A1 | 12/2011 | Hsiao et al. |
| 2011/0307320 A1 | 12/2011 | Tangney et al. |
| 2011/0307321 A1 | 12/2011 | Tangney et al. |
| 2011/0307322 A1 | 12/2011 | Hsiao et al. |
| 2011/0307324 A1 | 12/2011 | Hsiao et al. |
| 2011/0307325 A1 | 12/2011 | Hsiao et al. |
| 2011/0307326 A1 | 12/2011 | Hsiao et al. |
| 2011/0307330 A1 | 12/2011 | Hsiao et al. |
| 2011/0307509 A1 | 12/2011 | Hsiao et al. |
| 2011/0307515 A1 | 12/2011 | Chen et al. |
| 2012/0130826 A1 | 5/2012 | Hubert |
| 2012/0179677 A1 | 7/2012 | Roselli et al. |

* cited by examiner

REMOTE VIEWING OF DOCUMENTS VIA THE WEB IN REAL-TIME

FIELD OF THE INVENTION

The present invention relates to the remote viewing of documents via the web in real-time. Specifically, the present invention provides an approach for monitoring the processing of a web document to be monitored on a per page basis.

BACKGROUND OF THE INVENTION

On-line Meetings typically have ways in which at least one presenter can upload and collaborate on various types of documents. Usually, these documents have to be converted to a format suitable for rendering on different types of clients, so it can be presented. Whether the solution involves server-side conversion or client-side conversion, the user is typically required to wait until the entire document has been processed before anyone is able to begin viewing the presented document. Depending on the size, length and content of the document, this may take a long time. This leaves the presenter in an awkward situation where the presentation can not begin, until the entire document has been processed for all intended recipients.

In view of the foregoing, there exists a need for a solution that solves at least one of the deficiencies in the related art.

SUMMARY OF THE INVENTION

This invention offers a component that enables the presenter to begin presenting the first pages of the document as they become available, without having to wait on the entire document to be processed. The present invention provides an approach that is used to monitor document processing as it taking place on a server. As each page is in the document is processed (e.g., converted), a monitoring component signals a controlling component to alert it of the specific progress events (ex: a new page available). The controlling component can immediately interface with clients using a real-time communication component, for example letting users know when each single page is available for consumption. Once alerted, an informed client can signal all other clients which page to view. Thus, the present invention allows for remote viewing of documents via the web in real-time.

A first aspect of the present invention provides a method for making individual pages of a document available for remote viewing on-line in real-time, comprising: receiving the document on a server; sending a real-time signal to users associated with the document; engaging a monitoring process to monitor a processing of the document; engaging a conversion process to process the document for presentation on a set of remote clients; and sending a real-time signal to at least one of the set of remote clients, as each single page of the document is available for presentation based on the monitoring process.

A second aspect of the present invention provides a system for making individual pages of a document available for remote viewing on-line in real-time, comprising: a module for receiving the document on a server; a module for sending a real-time signal to users associated with the document; a module for engaging a monitoring process to monitor a processing of the document; a module for engaging a conversion process to process the document for presentation on a set of remote clients; and a module for sending a real-time signal to at least one of the set of remote clients, as each single page of the document is available for presentation based on the monitoring process.

A third aspect of the present invention provides a program product stored on a computer readable medium for making individual pages of a document available for remote viewing on-line in real-time, the computer readable medium comprising program code for causing a computer system to: receive the document on a server; send a real-time signal to users associated with the document; engage a monitoring process to monitor a processing of the document; engage a conversion process to process the document for presentation on a set of remote clients; and send a real-time signal to at least one of the set of remote clients, as each single page of the document is available for presentation based on the monitoring process.

A fourth aspect of the present invention provides a method deploying a system for making individual pages of a document available for remote viewing on-line in real-time, comprising: providing a computer infrastructure being operable to: receive the document on a server; send a real-time signal to users associated with the document; engage a monitoring process to monitor a processing of the document; engage a conversion process to process the document for presentation on a set of remote clients; and send a real-time signal to at least one of the set of remote clients, as each single page of the document is available for presentation based on the monitoring process.

A fifth aspect of the present invention provides a data processing system for making individual pages of a document available for remote viewing on-line in real-time, comprising: a memory medium having instructions; a bus coupled to the memory medium; and a processing unit coupled to the bus that when executing the instructions case the data processing system to: receive the document on a server; send a real-time signal to users associated with the document; engage a monitoring process to monitor a processing of the document; engage a conversion process to process the document for presentation on a set of remote clients; and send a real-time signal to at least one of the set of remote clients, as each single page of the document is available for presentation based on the monitoring process.

BRIEF DESCRIPTION OF THE DRAWINGS

These and other features of this invention will be more readily understood from the following detailed description of the various aspects of the invention taken in conjunction with the accompanying drawings in which.

Figure 1:
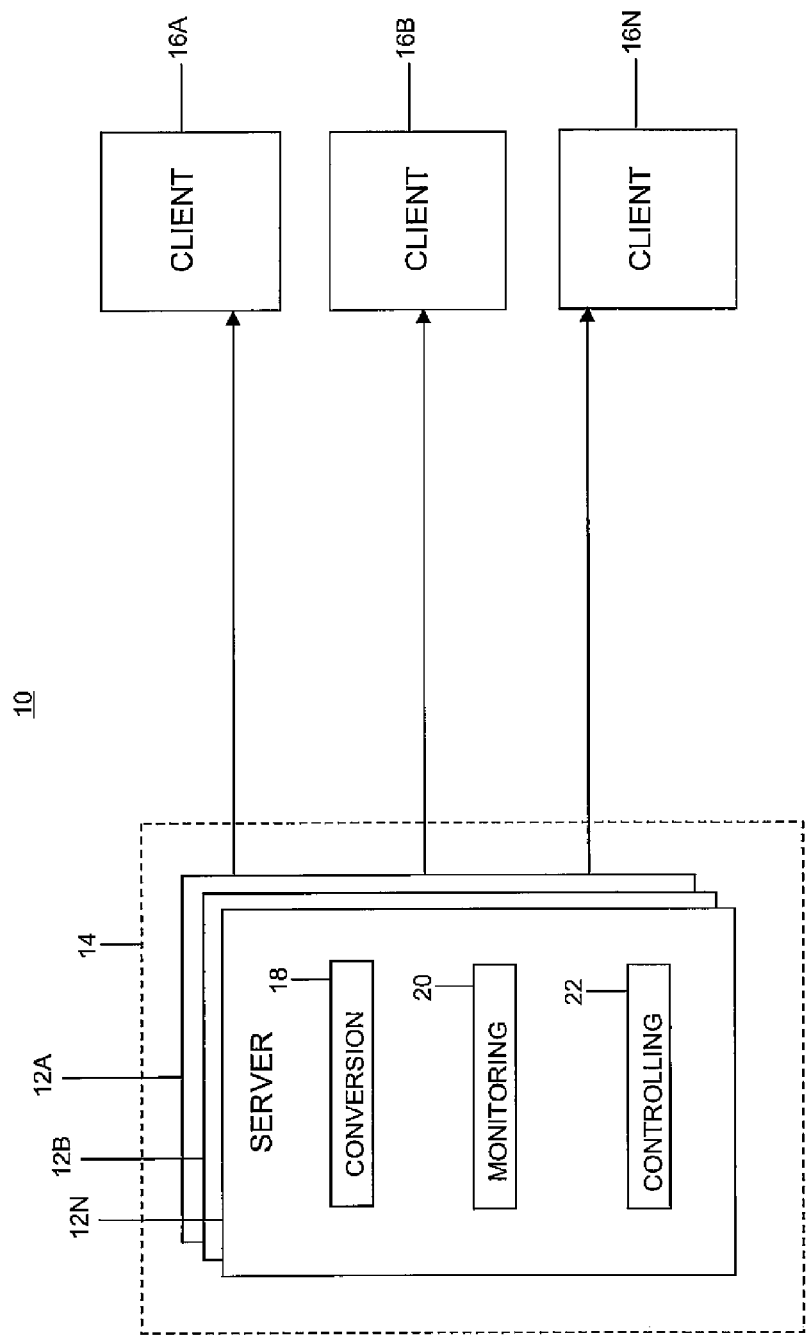
FIG. 1 shows an illustrative system making individual pages of a document available for remote viewing on-line in real-time according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description

II. Computerized Implementation

I. General Description

As indicated above, the present invention offers a component that enables the presenter to begin presenting the first pages of the document as they become available, without having to wait on the entire document to be processed. The present invention provides an approach that is used to monitor document processing as it taking place on a server. As each page is in the document is processed (e.g., converted), a monitoring component signals a controlling component to alert it of the specific progress events (ex: a new page available). The controlling component can immediately interface with clients using a real-time communication component, for example letting users know when each single page is available for consumption. Once alerted, an informed client can signal all other clients which page to view. Thus, the present invention allows for remote viewing of documents via the web in real-time.

One advantage of this over-all system, is that all users are able to see/use the initial pages, even while the conversion is still on-going, and do not have to wait for a potentially long or complex process to complete in order to begin the presentation with other on-line users.

Referring to FIG. 1, an illustrative 10 according to the present invention is shown. As depicted, system includes a set (e.g., one or more) of servers 12A-n in communication with a set of clients 16A-N. Servers 12A-N can optionally be deployed within a common computer infrastructure 14. This embodiment shows how the invention can be implemented via pure HTTP including all real-time communication, raw document transfer, and process document access. This means ubiquitous software such as browsers and mobile devices can benefit using the components of the invention.

Shown within server 12A is program code for implementing the teachings herein: conversion component 18, monitoring component 20, and controlling component 22. Conversion component 18 is intended to be any type of process executed/engaged by controlling component 22 that can be used to convert, transform or otherwise process documents received from clients 16A-N. To this extent, two or more of components 18, 20, and 22 can be realized as a single program or as multiple programs. Controlling component 22 is typically a Servlet while monitoring component 20 is typically a process executed/engaged by controlling component 22. It should be understood that these components need not reside on a single server such as server 12A. For example, components 18, 20, and 22 could reside on two or more separate and distinct servers. The steps of the present invention will now be explained in the context of a document being received from client 16A for format conversion and distribution to clients 16B-N. The following steps will occur:

(1) Controlling component 22 receives a multi-part mime posting from a client, via an HTTP POST request. Once fully received, the file can be saved to a disk or other form of accessible resource for later processing.

(2) While still acting on the single thread related to the POST request, controlling component 22 can send a real-time signal to other on-line users associated with the file (e.g., in the same meeting) using existing real-time APIs and systems. This can be done asynchronously, meaning that it is optimal if controlling component 22 is not blocked or forced to wait for the message to be sent (or received) by clients 16A-N. It can also be achieved by setting some state on the server, which is periodically polled by clients using HTTP, or more efficiently using techniques such as "reverse AJAX" or HTTP tunneling.

(3) While still acting on the single thread related to the POST request in step 1, controlling component 22, engages a dedicated monitoring process, responsible for monitoring the progress of a document's processing. For example, this can be a Java-based class that extends the Java Thread class, which monitors a directory on the file system, looking for newly added pages. Monitoring events are address in later steps, but it's important to note that primary control is returned immediately back to controlling component 22.

(4) While still acting on the single thread related to the POST request in step 1, after steps 2 and 3, controlling component 22, engages (e.g., a dedicated) conversion component 18, which is responsible for converting the saved document. Note that the conversion component 18 is loosely coupled from the monitoring component 20. The only requirement is that the conversion component 18 and monitoring component 20 share access to a common resource such as file system directory, or database.

(5) While still acting on the single thread related to the POST request in step 1, after steps 2, 3 and 4, the controlling component 22 can immediately respond to posting client 16A. Note that this can return control to the posting client 16A, assuring that the upload is complete. Note that steps 2, 3, & 4 happen on unique parallel threads, such that step 5 happens almost immediately after step 1 completes, which prevents posting client 16A from being blocked. Since steps 2, 3 & 4 above invoked parallel processes to start various components, the following discusses the on-going actions of these parallel processes:

(A) The monitoring component polls the shared resource (ex: directory) for the current list of files that it contains. The initial scan of the shared resource will list document pages that currently exist. Monitoring component 20 is able to notify listeners of this event (ex: asynchronously callback into controlling component 22). Monitoring component 2 continues to monitor the shared resource, remembering the list of files on the former scan, if more files exist than the last time, the new files are determined. In addition, the monitor component is able to callback into controlling component 22 as new pages are available (see e.g., step C.1). Monitoring component 20 continues operating in parallel, until controlling component 22 stops it (see step B).

(B) Conversion component 22 is able continue operating in parallel, and once the entire document is processed, conversion component 18 calls back into controlling component 22, letting it know that the document processing is complete (see step C.2). This will free and/or clean-up the resources associated with the parallel conversion component 22.

(C.1) When controlling component 22 is invoked asynchronously by monitoring component 20, regarding new page availability, it interfaces with the real-time system to inform remote clients of the newly available pages, as in step 2 above. The real-time notification could be a simple reference to the converted resource, for example a URL to a specific converted page, accessible via HTTP. It is not necessary that the page is sent at this time, only a reference is needed to make its availability known.

(C.2) When controlling component 22 is invoked asynchronously by the conversion component 18, regarding conversion process completion, it stops monitoring component 20, and interfaces with the real-time system to inform remote clients 16A-N that the document is now fully processed. The real-time notification could be a "document complete" message, sent via HTTP, or saved as server-side state, and polled by clients 16A-N later. Clients 16A-N are expected to use this notification to update their user interface, to let users know that the document has finished converting.

(D) The clients 16A-N that receive the real-time notifications of pages (as they become available), are able to signal each other (using the same real-time system), to indicate which of the pages should be viewed. As indicated in step C.2, the page notifications are typically references to pages, and could be a simple URL to an HTML friendly resource (such as an image). The use or resource references makes the over all system very light-weight, low-latency, and easily accessible.

It should be noted that these components do not have to be implemented in the Java programming language, nor are they tied to any specific conversion system, or real-time system. The current implementation uses AJAX techniques for delivering the message about new pages from the server to browsers, and all client-side code is developed in HTML and JavaScript, thus making it easy to access and deploy. However, it would be possible to use other techniques and languages based on the same methods and components described here. An overall effect of this system and its components is that users are able see the first page of a presentation almost immediately, and then see the second page become available shortly thereafter, and so on. As a result, users do not have to wait for the entire document to be converted in order to start a presentation.

II. Computerized Implementation

Figure 2:
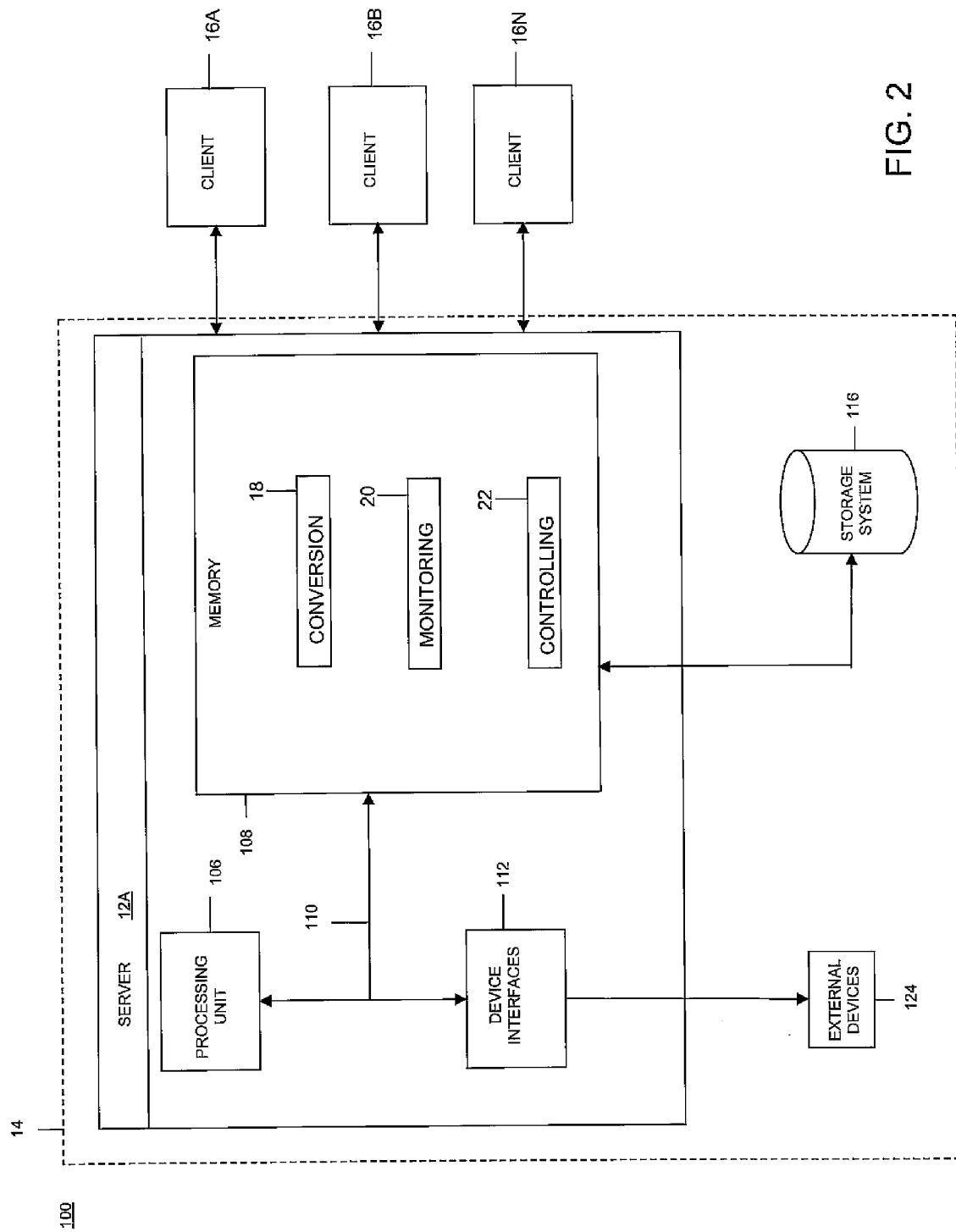
FIG. 2 shows a more detailed computerized implementation of the present invention.

Referring now to FIG. 2, a more detailed diagram of a computerized implementation 100 of the present invention is shown. As depicted, implementation 100 includes server 12A deployed within a computer infrastructure 14. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, as indicated in FIG. 1 computer infrastructure 14 is intended to demonstrate that some or all of the components of implementation 100 could be deployed, managed, serviced, etc. by a service provider who offers to implement, deploy, and/or perform the functions of the present invention for others.

As shown, server 12A includes a processing unit 106, a memory 108, a bus 110, and input/output (I/O) interfaces 112. Further, server 12A is shown in communication with external I/O devices/resources 114 and storage system 116. In general, processing unit 106 executes computer program code, such as operational support program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in server 12A. External devices 114 can comprise any devices (e.g., keyboard, pointing device, display, etc.) that enable a user to interact with server 12A and/or any devices (e.g., network card, modem, etc.) that enable server 12A to communicate with one or more other computing devices.

Computer infrastructure 14 is only illustrative of various types of computer infrastructures for implementing the invention. For example, in one embodiment, computer infrastructure 14 comprises two or more computing devices (e.g., a server cluster) that communicate over a network to perform the process(es) of the invention. Moreover, server 12A is only representative of various possible computer systems that can include numerous combinations of hardware. To this extent, in other embodiments, server 12A can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 2 can be included in server 12A. However, if server 12A comprises a handheld device or the like, it is understood that one or more external devices 114 (e.g., a display) and/or storage system 116 could be contained within server 12A, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into server 12A. It should be understood server 12A could be any combination of human, hardware and/or software. It is shown as such to illustrate the functions as described herein.

Shown in memory 108 of server 12A are conversion component 18, monitoring component 20, and controlling component 22. As indicated above, it should be understood that this configuration of functionality is intended to be illustrative only, and that identical or similar functionality could be provided with a different configuration. In any event, components 18, 20, and 22 are program code or modules capable implement the steps described above in receiving posts from clients 16A-N, and monitoring its conversion and sending a real-time signal to one or more clients 16A-N as each single page of the document is available for presentation.

While shown and described herein as method for making individual pages of a document available for remote viewing on-line in real-time, it is understood that the invention further provides various alternative embodiments. For example, in one embodiment, the invention provides a computer-readable/useable medium that includes computer program code to enable a computer infrastructure for making individual pages of a document available for remote viewing on-line in real-time. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 2) and/or storage system 116 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to method for make individual pages of a document available for remote viewing on-line in real-time. In this case, the service provider can create, maintain, support, etc., a computer infrastructure, such as computer infrastructure 14 (FIG. 2) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for method for making individual pages of a document available for remote viewing on-line in real-time. In this case, a computer infrastructure, such as computer infrastructure 14 (FIG. 2), can be provided and one or more systems for performing the process of the invention can be obtained (e.g., created, purchased, used, modified, etc.) and deployed to computer infrastructure 14. To this extent, the deployment of a system can comprise one or more of: (1) installing program code on a computing device, such as server 12A (FIG. 2), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for making individual pages of a document remotely viewable on-line in real-time, comprising:
   receiving a document by a controlling component of a server, the document received via a single thread related to an HTTP POST request;
   acting on the single thread related to the HTTP POST request, performing a plurality of document processing and communication processes in parallel, the plurality of document processing and communication processes including:
     sending an initial real-time indicator via the controlling component, the initial real-time indicator indicating the document has reached the server, to at least one of a posting client responsible for sending the document to the server and a set of remote clients, wherein the initial real-time indicator is sent asynchronously;
     engaging a monitoring component of the server to:
       continuously poll the server for a current list of available pages of the received document; and
       asynchronously update the controlling component of the server to identify newly available pages from the current list of the available pages of the received document,
     wherein the monitoring component is engaged by the controlling component of the server;
     engaging a conversion component of the server to:
       continuously convert pages of the received document in response to determining the pages of the received document are not included on the current list of available pages of the received document; and
       asynchronously update the controlling component of the server to identify that all pages of the received document are converted; and
     asynchronously sending distinct real-time indicators via the controlling component to the posting client and each of the set of remote clients as each page of the received document becomes available; and
     sending a complete real-time indicator to the posting client and each of the set of remote clients, in response to the conversion component on the server asynchronously updating the controlling component to identify that all pages of the received document are converted.

2. The method of claim 1, further comprising sending a client real-time indicator from at least one remote client of the set of remote clients to at least one other distinct remote client of the set of remote clients, the client real-time indicator indicating a specific, individual page of the document is remotely viewable.

3. The method of claim 1, wherein the document includes a multi-part mime document, sent by the posting client.

4. The method of claim 1, wherein converting includes:
separating a set of individual pages of the document to create individual files for each of the individual pages of the document; and
converting each individual page of the document to a common viewing format for remote viewing by each of the set of remote clients,
wherein the converted individual pages of the document are remotely viewable by each of the set of remote clients prior to all of the individual pages of the document becoming remotely viewable.

5. The method of claim 1, wherein performing the plurality of document processing and communication processes in parallel while acting on the single thread related to the HTTP POST request further comprises:
preventing the posting client from being blocked from the server.

6. The method of claim 1, further comprising:
stopping the performing of the plurality of document processing and communication processes in parallel in response to at least one of:
the conversion component on the server asynchronously updating the controlling component to identify that all pages of the received document are converted; and
the monitoring component on the server asynchronously updating the controlling component of the server to identify all pages of the received document are on the current list of the available pages of the received document,
wherein the stopping is performed by the controlling component.

7. A computer system comprising:
at least one computing device including:
at least one processor; and
a plurality of components in communication with the at least one processor, the plurality of components including a controlling component, a monitoring component and a conversion component,
wherein the plurality of components are configured to make individual pages of a document remotely viewable on-line in real-time by performing a process including:
receiving a document by the controlling component on the at least one computing device, the document received via a single thread related to an HTTP POST request;
acting on the single thread related to the HTTP POST request, performing a plurality of document processing and communication processes in parallel, the plurality of document processing and communication processes including:
sending an initial real-time indicator via the controlling component, the initial real-time indicator indicating the document has reached the controlling component to at least one of a posting client responsible for sending the document and a set of remote clients,
wherein the initial real-time indicator is sent asynchronously;
engaging the monitoring component to:
continuously poll the at least one computing device for a current list of available pages of the received document; and
asynchronously update the controlling component to identify newly available pages from the current list of the available pages of the received document,
wherein the monitoring component is engaged by the controlling component;
engaging the conversion component to:
continuously convert pages of the received document in response to determining the pages of the received document are not included on the current list of available pages of the received document; and
asynchronously update the controlling component to identify that all pages of the received document are converted; and
asynchronously sending distinct real-time indicators via the controlling component to the posting client and each of the set of remote clients as each page of the received document becomes available; and
sending a complete real-time indicator to the posting client and each of the set of remote clients, in response to the conversion component asynchronously updating the controlling component to identify that all pages of the received document are converted.

8. The computer system of claim 7, wherein the document includes a multi-part mime document, sent by the posting client.

9. The system of claim 7, wherein the at least one computing device is further configured to send a client real-time indicator from at least one remote client of the set of remote clients to at least one other distinct remote client of the set of remote clients, the client real-time indicator indicating a specific individual page of the document is remotely viewable.

10. The system of claim 7, wherein the at least one computing device is further configured to make a set of individual pages of the document remotely viewable by
separating the individual pages of the document to create individual files for each of the individual pages of the document on the computer system; and
converting each individual page of the document to a common viewing format for remote viewing by each of the set of remote clients,
wherein the converted individual pages of the document are remotely viewable by each of the set of remote clients prior to the determining that all of the individual pages of the document are remotely viewable.

11. The system of claim 7, wherein the conversion component is coupled to the monitoring component.

12. The system of claim 11, wherein the conversion component and the monitoring component have access to a storage system including a database.

13. A program product stored on a non-transitory computer readable medium for making individual pages of a document remotely viewable on-line in real-time, the computer readable medium comprising program code for causing a computer system to:
receive a document by a controlling component of the computer system, the document received via a single thread related to an HTTP POST request;
acting on the single thread related to the HTTP POST request, perform a plurality of document processing and communication processes in parallel, the plurality of document processing and communication processes including:

sending an initial real-time indicator via the controlling component, the initial real-time indicator indicating the document has reached the computer system, to at least one of a posting client responsible for sending the document to the computer system and a set of remote clients, wherein the initial real-time indicator is sent asynchronously;

engaging a monitoring component of the computer system to:

continuously poll the computer system for a current list of available pages of the received document; and asynchronously update the controlling component of the computer system to identify newly available pages from the current list of the available pages of the received document, wherein the monitoring component is engaged by the controlling component of the computer system;

engaging a conversion component of the computer system to:

continuously convert pages of the received document in response to determining the pages of the received document are not included on the current list of available pages of the received document; and asynchronously update the controlling component of the computer system to identify that all pages of the received document are converted; and asynchronously sending distinct real-time indicators via the controlling component to the posting client and each of the set of remote clients as each page of the received document becomes available; and send a complete real-time indicator to the posting client and each of the set of remote clients, in response to the conversion component on the computer system asynchronously updating the controlling component to identify that all pages of the received document are converted.

14. The program product of claim 13, wherein the document includes a multi-part mime document, sent by the posting client.

15. The program product of claim 13, the computer readable medium further comprising program code for causing the computer system to send a client real-time indicator from at least one remote client of the set of remote clients to at least one other distinct remote client of the set of remote clients, the client real-time indicator indicating a specific individual page of the document is remotely viewable.

16. The program product of claim 13, the computer readable medium further comprising program code for causing the computer system to make a set of individual pages of the document remotely viewable by:

separating the individual pages of the document to create individual files for each of the individual pages of the document on the computer system; and converting each individual page of the document to a common viewing format for remote viewing by each of the set of remote clients, wherein the converted individual pages of the document are remotely viewable by each of the set of remote clients prior to the determining that all of the individual pages of the document are remotely viewable.

* * * * *